May 6, 1958  F. LEBER  2,833,939
SWITCHING MECHANISM
Filed March 10, 1954  3 Sheets-Sheet 2
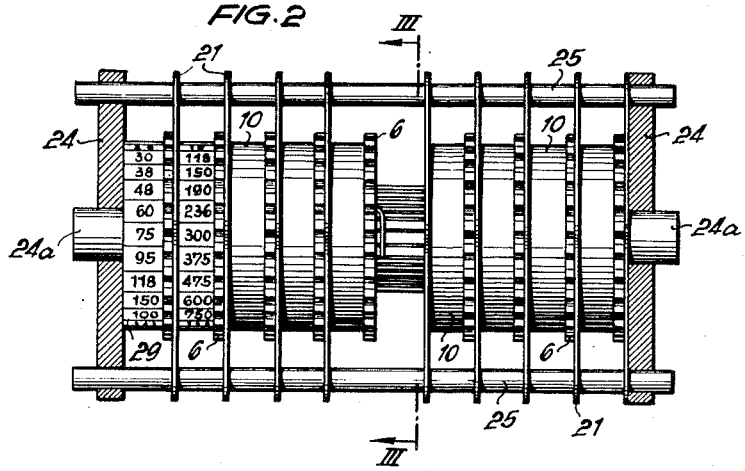
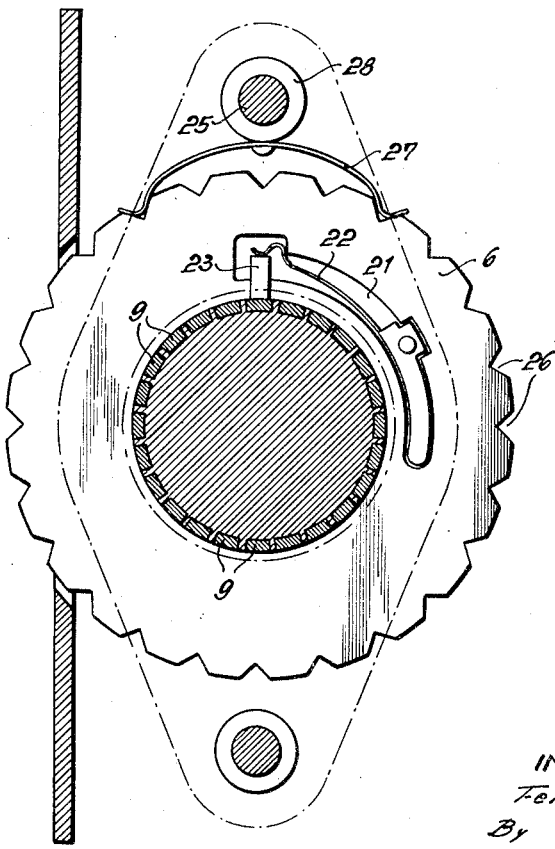
INVENTOR
Felix Leber
By Wallin Berлин
Patent Agent.

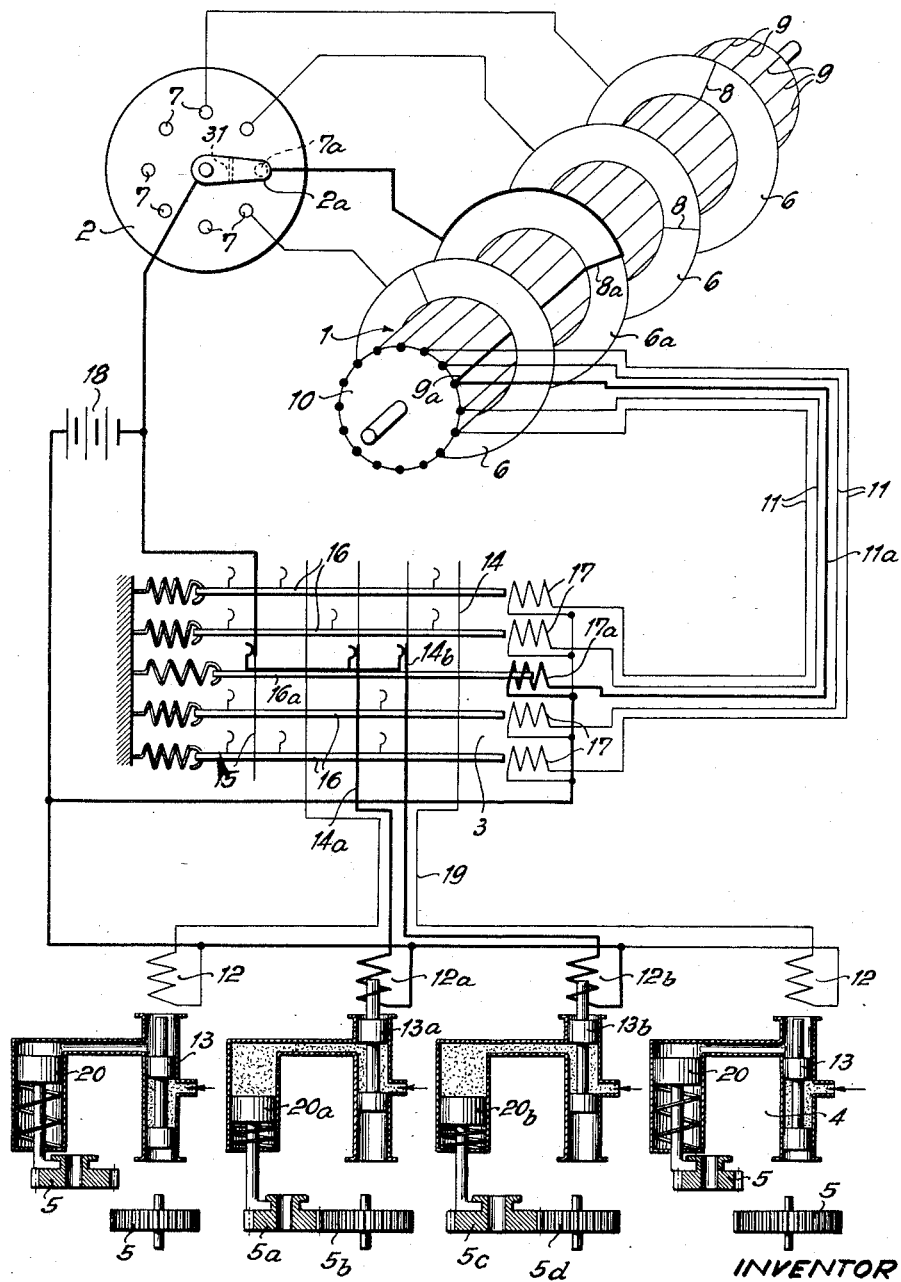

May 6, 1958     F. LEBER     2,833,939
SWITCHING MECHANISM

Filed March 10, 1954     3 Sheets-Sheet 3

INVENTOR
Felix Leber

United States Patent Office 2,833,939
Patented May 6, 1958

2,833,939

SWITCHING MECHANISM

Felix Leber, Koln-Riehl, Germany

Application March 10, 1954, Serial No. 415,385

Claims priority, application Germany March 11, 1953

7 Claims. (Cl. 307—112)

The present invention relates to a device for storing commands, especially for machine tools, which type of device is commonly called pre-set control or presettable control switching mechanism.

Such presettable switching mechanism is intended to make it possible prior to the actual operation of the machine to pre-set on the machine in a predetermined sequence the desired commands, e. g certain speeds, feeds, boring depth etc., and then to make it possible by means of corresponding switch elements to release said commands in the desired sequence so that the respective machine operations will be carried out.

With the heretofore known devices of this type, as many switches are to be provided as there are working operations to be controlled. Each of the said switches must have as many contacts as there are setting possibilities, for instance speeds, feeds, boring depths, etc. The contacts of all switches which allow a certain setting possibility must be interconnected by conductors. Such a device is rather complicated and difficult to check in view of the numerous conductors and is, in view of the numerous connecting points, not sufficiently reliable in operation.

It is, therefore, an object of this invention to provide an improved presettable switching mechanism for storing commands, especially for operations of machine tools, which will overcome the above mentioned drawbacks.

It is another object of this invention to provide an improved switching mechanism for storing commands of machining operations of machine tools, which will make it possible to have all commands required for the various operations of the machine tool pre-set by a skilled worker and then to have an unskilled worker operate the machine tool for machining the respective workpiece accordingly.

Still another object of this invention consists in the provision of an improved switching mechanism for storing commands, especially for operations of machine tools, which will allow pre-setting of all operations required for machining a work-piece and in which the various operative steps will automatically be made effective in a desired sequence.

These and other objects and advantages of the invention will appear more clearly from the following specification in connection with the accompanying drawings in which:

Fig. 1 illustrates a perspective view of a device according to the present invention with command switch for use in connection with an electric hydraulic transmission control of a machine tool.

Fig. 2 represents a view of a pre-selector switching mechanism in conformity with the invention.

Fig. 3 is a cross section along the line III—III of Fig. 2 on a somewhat larger scale than that used in Fig. 2.

*General arrangement*

Figure 4:
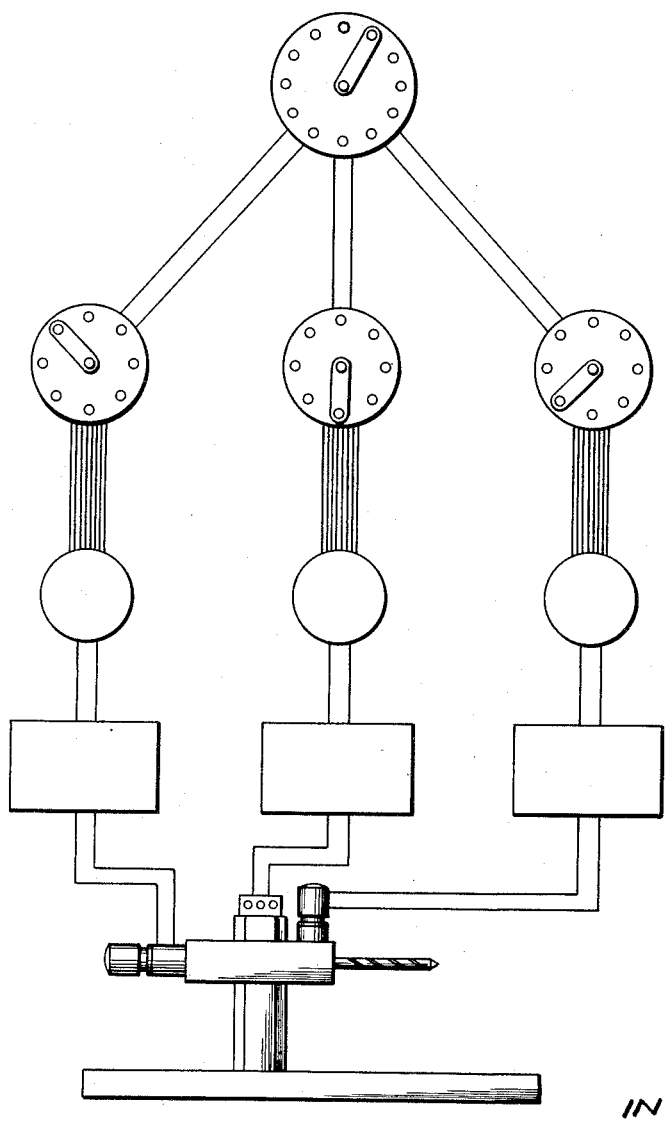
Fig. 4 is a further illustration of the circuits involved.

The device according to the present invention for storing commands comprises primarily a shaft or cylinder which represents the pre-selector and comprises a plurality of metal strips or plates each of which is adapted when passing current therethrough to release a certain operation. Rotatably mounted on said plates are a plurality of rings for setting the respective commands. The said rings are adapted to establish electrical connection between the contacts associated with the respective setting rings of a command switch and the desired plate. Associated with the said shaft or cylinder is, according to the present invention, a command switch of the type of a stepped switch the contacts of which receive voltage in a predetermined sequence when automatic operation is effected or receive voltage in any desired sequence when manual operation is effected.

*Structural arrangement*

Referring now to the drawings in detail, the arrangement shown in Fig. 1 comprises a pre-selector generally designated 1, a command switch 2, and a combination switch element 3 for carrying out the commands given by the switch 2 and stored on the pre-selector 1. The device furthermore comprises an electric hydraulic control device 4 for the transmission gears 5, 5a, 5b, 5c, 5d of the machine tool. Mounted on the pre-selector 1 are setting rings 6, 6a. Each of these setting rings is connected with one of the contacts 7, 7a of the command switch 2. Depending on its angular position, each contact pertaining to the respective setting ring of the command switch is connected through a radial conductor 8, 8a with one lamella or bar 9, 9a of the cylinder 10 which latter consists of insulating material.

The lamellae or bars 9, 9a of the pre-selector 1 are connected with a combination switch element 3 by means of conductors 11, 11a. The purpose of this arrangement consists in releasing those operations in conformity with the respective lamela or bar 9, 9a under voltage which will bring about the excitation of the stored commands.

According to the embodiment of the pre-selector of the invention shown in Fig. 1, the setting of a desired speed or desired feed is effected by a hydraulic displacement of the gears or the coupling elements 5 of a mechanical stepped transmission. A stepped transmission requires that, when said transmission is to be adjusted for a certain speed, simultaneously a plurality of gears or coupling elements must be displaced. Thus, a plurality of magnets 12, 12a, 12b which bring about the movement of the control slides 13, 13a, 13b of the hydraulic control device 4 must be placed under voltage. The electric connection of a plurality of conductors in different combinations as required for this purpose is effected by the combination switch element 3 by which the feeding conductors 14, 14a, 14b of the magnets 12, 12a, 12b are selectively connected with the neutral conductor 15. The actuation of the combination switch element 3 is according to illustrated embodiment effected by movement of the control rods 16, 16a. This movement is brought about by the excitation of the magnets 17, 17a. Connected with these magnets through conductors 11, 11a are the lamellae or bars 9, 9a of the pre-selector 1 so that in each instance only that magnet will receive current which has been preselected by the setting of the setting ring 6, 6a.

*Operation*

The operation of the device will best be understood with reference to the circuit shown in Fig. 1 by heavy lines and pertaining to a certain setting. In this specific circuit marked, as stated, by heavy lines, the setting ring 6a with its radial conductor 8a is adjusted for cooperation with the lamella or bar 9a. If now the arm 2a of the command switch 2 is brought into contact with contact 7a which latter is electrically connected with the ring 6a, current from the current source 18 passes through the setting ring 6a, the lamella or bar 9a, and the conductor 11a to the magnet 17a and from there back to the current source 18. As a result thereof, the magnet 17a attracts the control rod 16a so that the latter brings about connection of the conductors 14a, 14b with the neutral conductor 15. Due to this connection, the magnets 12a and 12b of the hydraulic transmission control are excited and move the respective control slides 13a and 13b pertaining thereto in such a manner that the control pistons 20a and 20b of the hydraulic device establish driving engagement between the gears 5a and 5b and 5c and 5d. This transmission arrangement corresponds to the command set on the ring 6a.

Depending on the type of the machine tool to which the device according to the invention is to be applied, a preselector 1 and a command switch 2 may be associated with each desired setting essential for the respective machine operation such as speed of the working spindle, feed, machining stroke, boring depth, etc.

These pre-selectors and command switches may be preceded by a command switch for setting the machining of a desired workpiece.

The command switch may each time after the completion of a working step automatically be switched over to the next contact so as to successively release the various operations of a pre-selected series of steps which have been pre-set on a pre-selector or on pre-selectors, such as the complete machining of a workpiece. However, if desired, the preset commands may also be released in any desired sequence by manually controlling the command switch 2.

The cylinder 10 of the pre-selector 1 has both ends thereof journalled in the casing walls 24 by means of studs or pivots 24a as shown in Fig. 2. Journalled in the walls 24 of the casing and parallel to the cylinder 10 are rods 25 of insulating material. Suspended on said rods 25 are plates 21 which are hanging between the setting rings 6, 6a without, however, contacting the cylinder 10. These plates 21 establish connection between a contact 7, 7a of the command switch 2 and one of the lamellae or bars 9, 9a of the cylinder 10. As shown in Fig. 3, this is brought about by a leaf spring 22 which presses against the respective plate 21, the leaf spring 22 being connected with a pin 23 which latter is resiliently pressed against the circumference of the cylinder 10.

In order to facilitate the setting of the setting rings 6, 6a, the said setting rings have markings 29 and are provided with notches or grooves 26. For purposes of arresting the setting rings 6, 6a, holding rings 28 with leaf springs 27 connected thereto are mounted on rods 25 so that the said springs 27 are adapted to engage the notches 26 in the manner of a ratchet and pawl mechanism.

The arrangement according to the present invention makes it possible to have a skilled worker pre-set all commands required for the machining of workpieces on a machine tool, while the actual operations of the machine can then be carried out by an unskilled worker by a mere movement of the command switch into the respective positions. By means of the pre-selector according to the present invention all machining possibilities can be preset with an extremely simple device which can easily be checked and requires a minimum of space. The device can be used in connection with any machine where commands are to be stored in a similar manner.

It is, of course, understood that the present invention is, by no means, limited to the particular arrangements shown in the drawings but also comprises any modifications within the scope of the appended claims.

When the command switch 2 is designed as a step switch, as diagrammatically indicated in Fig. 1, the switch arm 2a may be composed of two arm sections hinged together at 31 so that the outermost arm section may selectively be lifted off of the respective contacts 7, 7a and may engage these contacts in any desired sequence. On the other hand, the contact arm 2a may be connected through a disengageable clutch (not shown in the drawings) with a motor so as to be rotated thereby for successively engaging the contacts 7, 7a in the sequence in which they follow each other.

What I claim is:

1. A switching mechanism comprising in combination: a cylinder, a plurality of electric current conducting means carried by said cylinder and electrically insulated from each other, a plurality of spaced ring means adjustably mounted on said cylinder and respectively provided with contact means for selective electrical connection with any one of said conducting means, each of said conducting means extending through all of said ring means and being adapted to be connected with an electric circuit to be controlled by said switching mechanism, and each of said ring means being arranged for selective connection with and electric current source.

2. A switching mechanism comprising in combination: a cylinder, a plurality of electric current conducting means carried by said cylinder and electrically insulated from each other, a plurality of ring means adjustably mounted on said cylinder and spaced from each other in axial direction of said cylinder, a plurality of plate means respectively stationarily arranged between each two adjacent ring means in spaced relationship with regard to said cylinder and respectively arranged for electric connection with an electric current source, a plurality of slide contact means respectively supported by said ring means for respective sliding contact with said plate means, and additional contact means electrically connected to said slide contact means and arranged for selectively yieldably contacting any one of said conducting means in conformity with the respective adjusted position of the respective ring means.

3. A switching mechanism comprising in combination: a casing, a cylinder having both ends thereof journalled in said casing, a plurality of supporting members of insulating material extending substantially parallel to said cylinder and supported by said casing, a plurality of electric current conducting means carried by said cylinder and electrically insulated from each other, a plurality of coaxially arranged ring means spaced from each other in axial direction of said cylinder and mounted on said cylinder for rotative adjustment thereabout, a plurality of plate means respectively stationarily arranged between each two adjacent ring means in spaced relationship to said cylinder, said plate means being suspended on said supporting members and being arranged for selective electric connection with an electric current source, a plurality of slide contact means respectively supported by said ring means, spring means respectively yieldably pressing said slide contact means against said plate means, and additional contact means electrically connected to said slide contact means and supported by said ring means for selectively yieldably contacting any one of said conducting means in conformity with the adjustment of the respective ring means.

4. A switching mechanism comprising in combination: a casing, a cylinder having both ends thereof journalled in said casing, a plurality of supporting members of insulating material extending substantially parallel to said cylinder and supported by said casing, a plurality of electric current conducting means carried by said cylinder and electrically insulated from each other, said current conducting means extending in axial direction of said cylinder, a plurality of coaxially arranged ring means spaced from each other in axial direction of said cylinder and mounted on said cylinder for rotative adjustment thereabout, the periphery of said ring means being provided with notches, yieldable ratchet means arranged for engagement with said notches, a plurality of plate means respectively stationarily arranged between each two adjacent ring means in spaced relationship to said cylinder and arranged for selective electric connection with an electric current source, said plate means being suspended on said supporting members and carrying said ratchet means, a plurality of slide contact means respectively supported by said ring means, spring means respectively yieldably pressing said slide contact means against said plate means, and a plurality of additional contact means electrically connected to said slide contact means and supported by said ring means for selectively yieldably contacting any one of said conducting means in conformity with the adjusted position of the respective ring means.

5. A switching mechanism comprising in combination: a cylinder, a plurality of electric current conducting means carried by said cylinder and electrically insulated from each other, said conducting means extending in axial direction of said cylinder, a plurality of coaxially arranged ring means mounted on and adjustable relative to said cylinder, said ring means being provided with markings corresponding to the various possible setting positions thereof, a plurality of contact means respectively supported by said ring means for selective electric connection with any one of said conducting means in conformity with the respective position of the respective ring means, said current conducting means extending through all of said ring means, each of said contact means being arranged for selective electric connection with an electric current source, and said conducting means being arranged for respective connection with electric circuits to be controlled by said switching mechanism.

6. A presettable switching arrangement for controlling different machine operations, which comprises in combination: a plurality of command switches, a plurality of preselectors in form of cylinders associated with said command switches, each of said cylinders carrying a plurality of electric current conducting means electrically insulated from each other, a plurality of sets of ring means respectively mounted on and adjustable relative to said cylinders, each of the ring means of said sets of ring means being provided with contact means for selectively electrically contacting any of the conducting means on the respective cylinder pertaining thereto, each of said command switches comprising a plurality of contacts respectively electrically connected to said contact means of the ring means on the respective cylinder, and a master command switch arranged to control all of said first mentioned command switches and being operatively connected thereto for controlling the same.

7. An electrical presettable switch arrangement, which comprises in combination: a cylinder, a plurality of electric current conducting means supported by said cylinder and arranged thereon in spaced and substantially parallel relationship with regard to each other, said conducting means being insulated from each other and extending in longitudinal direction of said cylinder, a plurality of ring means adjustably mounted on said cylinder and respectively provided with contact means arranged for selective electrical connection with any one of said conducting means in conformity with the respective adjusted position of said ring means, and a plurality of control contacts respectively arranged for electrical connection with said contact means, and means operable selectively to connect any one of said control contacts with an electric current source.

References Cited in the file of this patent

UNITED STATES PATENTS

| | | |
|---|---|---|
| 1,760,943 | Fuller | June 3, 1930 |
| 1,764,411 | Masek | June 17, 1930 |
| 1,782,390 | Atticks et al. | Nov. 18, 1930 |
| 1,799,789 | Gwynne | Apr. 7, 1931 |
| 1,872,155 | Masek | Aug. 16, 1932 |
| 2,511,821 | Bullard | June 13, 1950 |